(12) United States Patent
Kim et al.

(10) Patent No.: US 7,770,488 B2
(45) Date of Patent: Aug. 10, 2010

(54) TILT-AND-TELESCOPE STEERING APPARATUS

(75) Inventors: Hyun Kim, Wonju (KR); Woo-Seob Shin, Wonju (KR); Jae-Moon Oh, Gongju (KR)

(73) Assignee: Mando Corporation, Gyeonggi (KR)

( * ) Notice: Subject to any disclaimer, the term of this patent is extended or adjusted under 35 U.S.C. 154(b) by 0 days.

(21) Appl. No.: 12/011,189

(22) Filed: Jan. 24, 2008

(65) Prior Publication Data
US 2008/0178701 A1 Jul. 31, 2008

(30) Foreign Application Priority Data
Jan. 31, 2007 (KR) .................. 10-2007-0009946

(51) Int. Cl.
*B62D 1/18* (2006.01)
(52) U.S. Cl. ............... 74/493; 280/775; 74/492
(58) Field of Classification Search .......... 74/492, 74/493; 280/775, 777
See application file for complete search history.

(56) References Cited

U.S. PATENT DOCUMENTS

| | | | | |
|---|---|---|---|---|
| 5,199,319 A | * | 4/1993 | Fujiu | 74/493 |
| 5,524,927 A | * | 6/1996 | Toussaint | 280/777 |
| 5,605,351 A | * | 2/1997 | Higashino | 280/775 |
| 5,607,184 A | * | 3/1997 | Barton | 280/775 |
| 5,655,413 A | * | 8/1997 | Barton | 74/493 |
| 5,788,277 A | * | 8/1998 | Hibino et al. | 280/775 |
| 5,988,010 A | * | 11/1999 | Olgren | 74/493 |
| 6,139,057 A | * | 10/2000 | Olgren et al. | 280/775 |
| 6,623,036 B2 | * | 9/2003 | Yamamura et al. | 280/775 |
| 6,695,349 B2 | * | 2/2004 | Bohlen et al. | 280/775 |
| 6,860,669 B2 | * | 3/2005 | Laisement et al. | 403/109.1 |
| 7,191,679 B2 | * | 3/2007 | Tomaru et al. | 74/493 |
| 7,219,926 B2 | * | 5/2007 | Ikeda et al. | 280/775 |
| 7,275,458 B2 | * | 10/2007 | Kinme et al. | 74/493 |
| 7,322,608 B2 | * | 1/2008 | Yamamoto et al. | 280/775 |
| 7,325,467 B2 | * | 2/2008 | Breuss et al. | 74/493 |
| 7,328,917 B2 | * | 2/2008 | Sawada et al. | 280/775 |
| 7,354,069 B2 | * | 4/2008 | Yamada | 280/775 |
| 2004/0261565 A1 | * | 12/2004 | Uphaus et al. | 74/493 |
| 2005/0066761 A1 | * | 3/2005 | Arihara | 74/493 |
| 2007/0295143 A1 | * | 12/2007 | Oh | 74/493 |

FOREIGN PATENT DOCUMENTS

| | | |
|---|---|---|
| JP | 2003-002211 | 1/2003 |
| JP | 2004-082868 | 3/2004 |
| KR | 1999-0050303 | 7/1999 |
| KR | 2005-0018141 | 2/2005 |

* cited by examiner

*Primary Examiner*—Richard W Ridley
*Assistant Examiner*—Matthew A Johnson
(74) *Attorney, Agent, or Firm*—McDermott Will & Emery LLP

(57) ABSTRACT

A tilt-and-telescope steering apparatus includes a plate bracket, an outer tube, a distance bracket, an outer block, and a fastening arrangement. The plate bracket surrounds an outer surface of an outer tube and has tilt adjustment holes formed on both sides of the plate bracket. The outer tube surrounds an inner tube and has telescopic adjustment hole formed in at least one side thereof. The distance bracket surrounds the outer surface of the outer tube and has fastening holes formed through both sides of the distance bracket. The outer block is positioned between the plate bracket and the distance bracket, and fastens the distance bracket according to the operation of a control lever. A fastener couples the plate bracket, the outer block, and the distance bracket to each other.

7 Claims, 4 Drawing Sheets

TILT-AND-TELESCOPE STEERING APPARATUS

CROSS-REFERENCE TO RELATED APPLICATION

This non-provisional application claims priority under 35 U.S.C §119(a) on Patent Application No. 10-2007-0009946 filed in Korea on Jan. 31, 2007, the entire contents of which are hereby incorporated by reference.

BACKGROUND OF THE INVENTION

1. Field of the Invention

The present invention relates to a tilt-and-telescope steering apparatus, and more particularly to a tilt-and-telescope steering apparatus including an outer block between a distance block and a plate block, which are assembled together by a fastening means, which is in line with a longitudinal axis of an outer tube and is operated in cooperation with a control lever, so that the apparatus can be employed in a car having a specification requiring an adjustment bolt extending through the outer tube and can improve a space use efficiency by reducing an additional space for the adjustment bolt.

The present invention also relates to a tilt-and-telescope steering apparatus including, in substitution for a conventional bush disposed between an outer tube and an inner tube, an inner block that can move along a telescopic adjustment hole formed on the lateral surface of the outer tube while pressing the outer surface of the inner tube through the operation of the control lever, so that a driver can freely control the load of the telescope. Further, in the apparatus, the plate bracket, the outer block and the inner block are integrally coupled through a fastening means, so that it is possible to simultaneously perform a tilt function and a telescope function through the operation of the control lever.

2. Description of the Prior Art

FIG. 1 is an exploded perspective view illustrating important parts of a conventional tilt-and-telescope steering apparatus. As illustrated in FIG. 1, a conventional tilt-and-telescope steering apparatus 100 includes an inner tube 103 and an outer tube 105 which surround a steering shaft 101 and can slide relative to each other, a mounting bracket 107 and a lower bracket 160 for fixing the tilt-and-telescope steering apparatus to a car chassis, a tilt bracket 130 integrally formed with the mounting bracket 107, and a distance bracket 120 coupled with the tilt bracket 130 by means of an adjustment bolt 140.

An upper end of the steering shaft 101 is coupled to a steering wheel (not shown) and transfers rotation force generated by a driver's operation of a steering wheel to a rack-pinion mechanism (not shown) in the lower end thereof.

The inner tube 103 has a cylindrical shape having a constant diameter, and surrounds a lower end of the steering shaft 101.

The lower bracket 160 is formed on the lower outer surface of the inner tube 103. The lower bracket 160 may be fixed to the car chassis, so as to fix the position of the inner tube 103.

The outer tube 105 has an inside diameter larger than the external diameter of the inner tube 103, and slides in the axial direction thereof on the outer surface of the inner tube 103. That is, a telescopic operation is possible. Meanwhile, the outer tube 105 surrounds a middle part of the steering shaft 101.

A telescopic bush (not shown) is disposed between an inner surface of the outer tube 105 and an outer surface of the inner tube 103, so as to provide a certain frictional force between the outer tube 105 and the inner tube 103 when the telescopic operation is performed.

The tilt bracket 130 and the distance bracket 120 are integrally formed in the mounting bracket 107, and both ends of the mounting bracket 107 are provided with capsules 110 for fixing the outer tube 105 to the car chassis.

An elongated hole is formed through a side portion of the tilt bracket 130, so as to allow a tilt operation depending on a driver's operation.

In the conventional tilt-and-telescope steering apparatus as described above, the longitudinal axis of the adjustment bolt, which extends through the tilt bracket and the distance bracket and is integrally coupled to the control lever, is not in line with a longitudinal axis of the outer tube, and the adjustment bolt is disposed outside the outer tube. Therefore, the conventional tilt-and-telescope steering apparatus can not be employed in a car having a specification, which requires an adjustment bolt extending through the outer tube and requires an additional space to be occupied by the adjustment bolt.

Moreover, the plastic material-made bushing for adjusting the frictional force between the outer tube and the inner tube in the conventional tilt-and-telescope steering apparatus cannot provide an appropriate frictional force and cannot allow a driver to freely control the load of the telescope when the bushing is worn away.

SUMMARY OF THE INVENTION

Accordingly, the present invention has been made to solve the above-mentioned problems occurring in the prior art, and the present invention provides a tilt-and-telescope steering apparatus including an outer block between a distance block and a plate block, which are assembled together by a fastening means, which is in line with a longitudinal axis of an outer tube and is operated in cooperation with a control lever, so that the apparatus can be employed in a car having a specification requiring an adjustment bolt extending through the outer tube and can improve a space use efficiency by reducing an additional space for the adjustment bolt. Also, the present invention provides a tilt-and-telescope steering apparatus including, in substitution for a conventional bush disposed between an outer tube and an inner tube, an inner block that can move along a telescopic adjustment hole formed on the lateral surface of the outer tube while pressing the outer surface of the inner tube through the operation of the control lever, so that a driver can freely control the load of the telescope.

In accordance with an aspect of the present invention, there is provided a tilt-and-telescope steering apparatus, which includes: a plate bracket surrounding an outer surface of an outer tube and having tilt adjustment holes formed on at least one side thereof; said outer tube surrounding an inner tube and having telescopic adjustment holes formed on both sides thereof; a ring-shaped distance bracket surrounding the outer surface of the outer tube and having fastening holes formed through both sides thereof; an outer block positioned between the plate bracket and the distance bracket and fastening the distance bracket according to the operation of a control lever; and a fastening bolt extending through the plate bracket, the outer block and into the fastening holes of the distance bracket.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
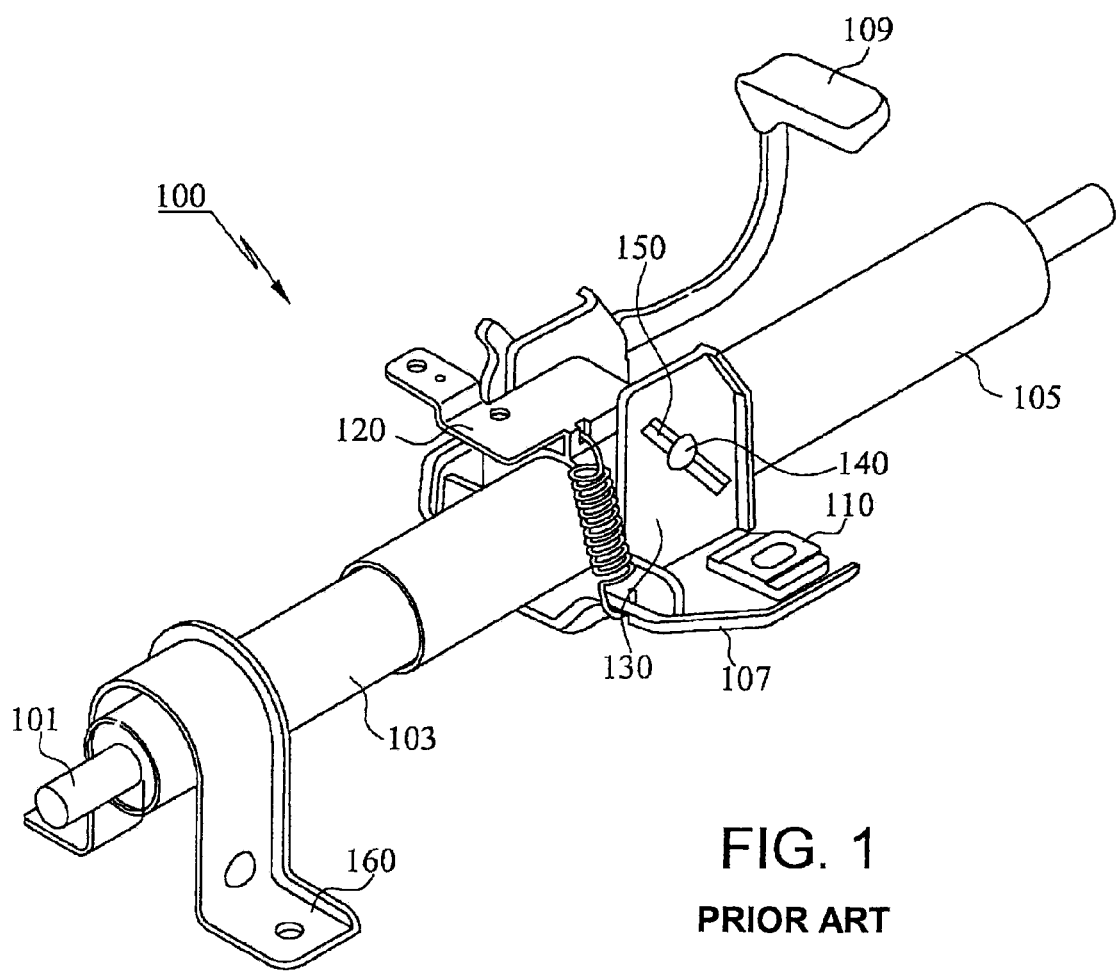
FIG. 1 is an exploded perspective view illustrating important parts of a conventional tilt-and-telescope steering apparatus.

Hereinafter, an exemplary embodiment of the present invention will be described with reference to the accompanying drawings. In the following description and drawings of the present invention, the same reference numerals are used to designate the same or similar components, and the detailed description of known functions and configurations incorporated herein is omitted to avoid making the subject matter of the present invention unclear.

Figure 2A:
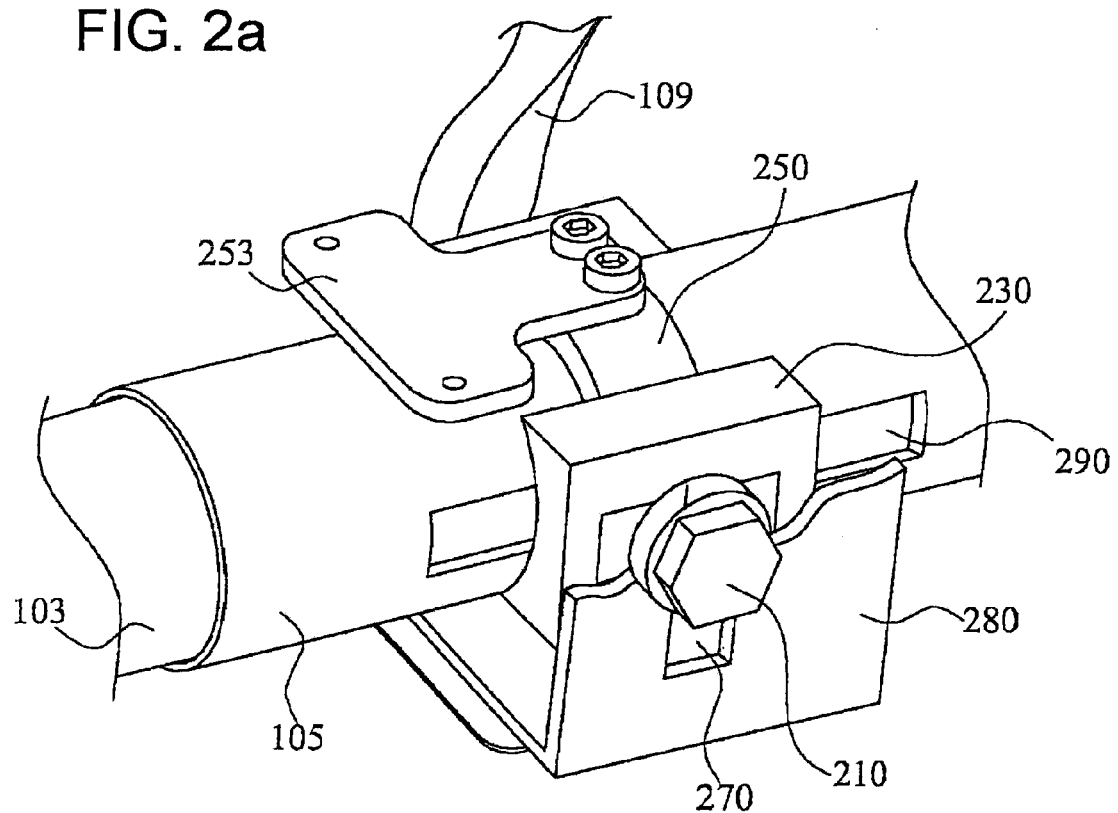
FIG. 2A is an enlarged perspective view illustrating a tilt-and-telescope steering apparatus according to an exemplary embodiment of the present invention.
Figure 2B:
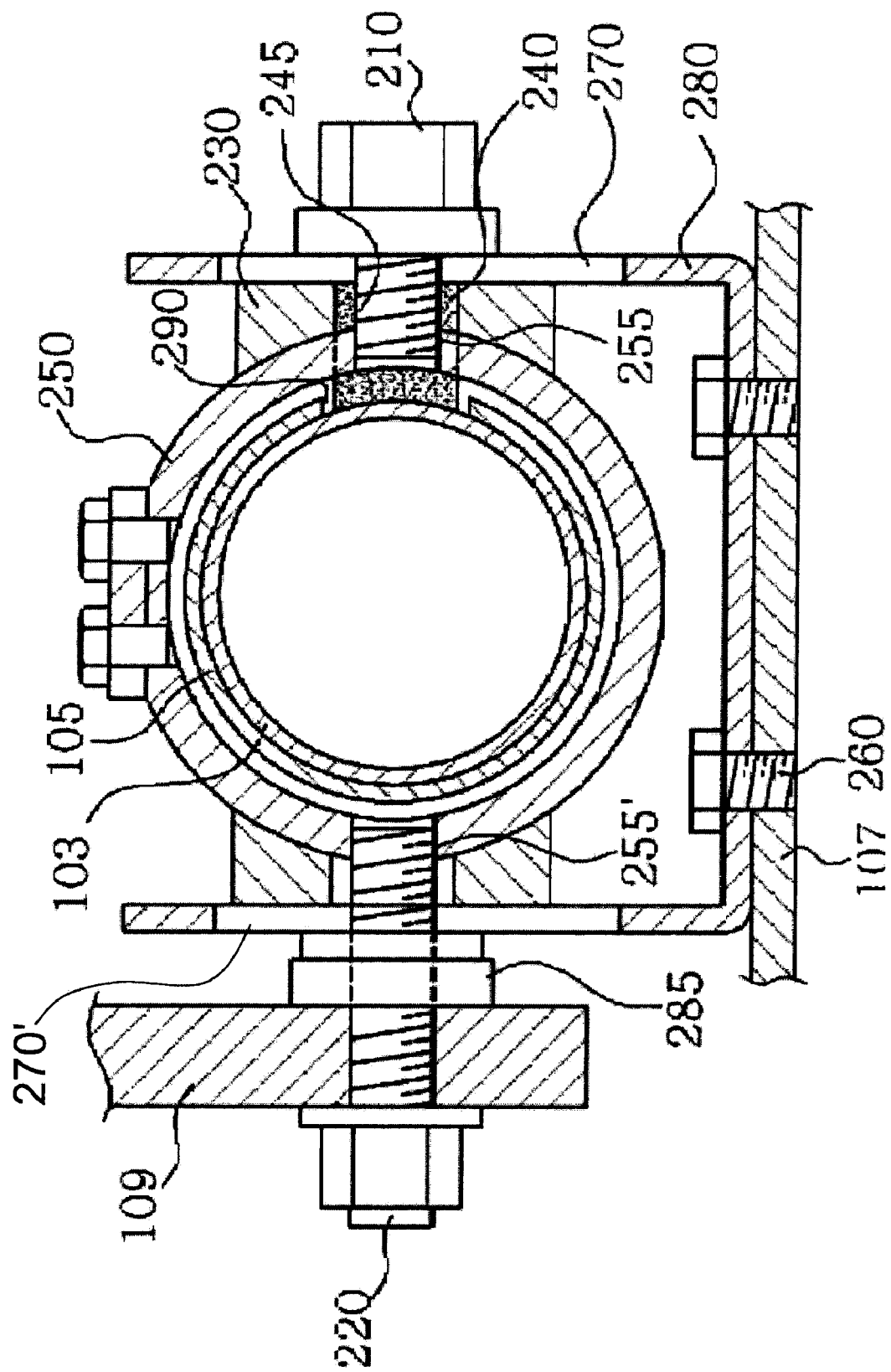
FIG. 2B is a section view illustrating a tilt-and-telescope steering apparatus according to an exemplary embodiment of the present invention.
Figure 2C:
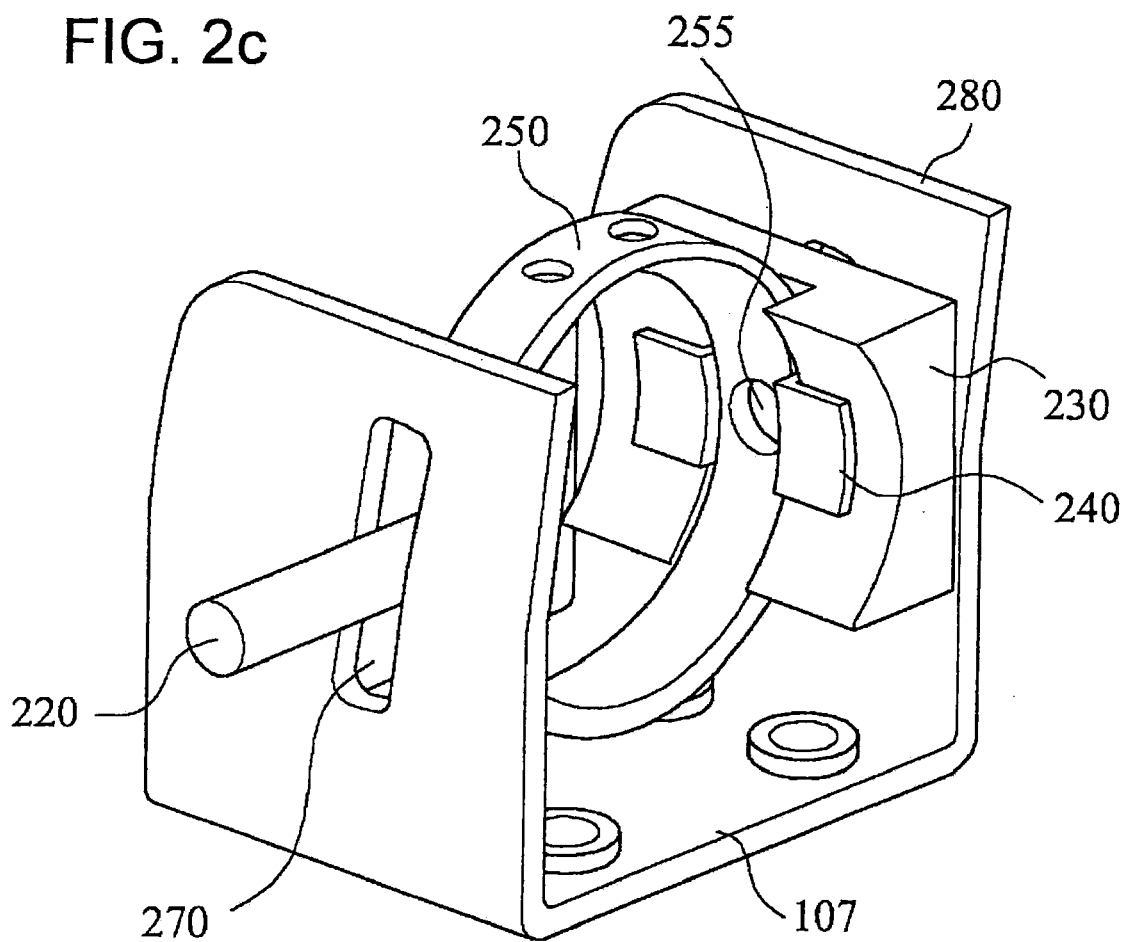
FIG. 2C is a partial perspective view illustrating a tilt-and-telescope steering apparatus according to an exemplary embodiment of the present invention.

FIG. 2A is an enlarged perspective view illustrating a tilt-and-telescope steering apparatus according to an exemplary embodiment of the present invention. FIG. 2B is a section view illustrating a tilt-and-telescope steering apparatus according to an exemplary embodiment of the present invention. FIG. 2C is a partial perspective view illustrating a tilt-and-telescope steering apparatus according to an exemplary embodiment of the present invention. As illustrated in FIGS. 2A to 2C, a tilt-and-telescope steering apparatus according to the present invention includes a plate bracket 280 surrounding the outer surface of an outer block 230 and having tilt adjustment holes 270 formed on both sides thereof, an outer tube 105 surrounding an inner tube 103 and having telescopic adjustment holes 290 formed on at least one side thereof, a distance bracket 250 according to the present invention (hereinafter, referred to as a distance bracket 250) having fastening holes formed on both sides thereof and surrounding the outer surface of the outer tube 105, an outer block 230 positioned between the plate bracket 280 and the distance bracket 250 and fastening the distance bracket 250 according to the operation of a control lever 109, and a first and a second fastening means 210 and 220 coupling the plate bracket 280, the outer block 230 and the distance bracket 250. The tilt-and-telescope steering apparatus may further include an inner block 240 that extends through the outer block 230 and the distance bracket 250 and is movable along the telescopic adjustment hole 290 formed on the outer tube 105.

The plate bracket 280 has a shape of a rectangular box having one open side and surrounding the outer surface of the outer block 230. The plate bracket 280 includes tilt adjustment holes 270 formed through both sides thereof and coupling bolts 260 fitted through a side opposite to the open side, so as to fix the plate bracket 280 to the mounting bracket 107.

The first and the second fastening means 210 and 220 extend through the tilt adjustment holes 270, 270' the outer block 230, the inner block 240 and the distance bracket 250. The first and the second fastening means 210 and 220 move up and down along the tilt adjustment holes 270, 270' to perform a tilt operation. It is preferable that each of the tilt adjustment holes 270, 270' has a width suitably larger than the diameters of the bodies of the first and the second fastening means 210 and 220, so that the first and the second fastening means 210 and 220 can smoothly move along the holes.

It is also preferred that the first and the second fastening means 210 and 220 are bolts, which can fix the outer block 230, the inner block 240 and the distance bracket 250 to the plate bracket 280 and can transfer an appropriate fastening force to the outer tube 105 and inner tube 103 according to the tilt and telescope operation by a driver.

The control lever 109 is provided at one side of the plate bracket 280. A cam 285 is disposed between the control lever 109 and the plate bracket 280. The control lever 109 and the cam 285 are fixed to one side of the plate bracket 280 by the second fastening means 220.

Under the condition that a fastening force between the plate bracket 280 and the outer block 230 is released by rotating the control lever 109 in one direction, when the control lever 109 is rotated in a reverse direction to the one direction after placing the outer tube 105 at a position that a driver desires, a cam 285 coupled to and inter-working with the control lever 109 by the second fastening means 220 fastens the one side of the plate bracket 280 toward the center of the outer tube 105, thereby fixing the position of the outer tube 105, which is the so-called "tilt function."

A telescopic adjustment slot or hole 290 is formed through at least one side of the outer tube 105. The inner block 240 is disposed within the outer block 230 and moves along the telescopic adjustment hole 290. When a driver fastens the plate bracket 280 by operating the control lever 109 in order to perform the tilt function, one end of the inner block 240 presses against the outer surface of the inner tube 103, so as to perform the telescopic function by fixing the inner tube 103 to an appropriate position within the outer tube 105.

Because the outer block 230, the inner block 240 and the plate bracket 280 are integrally coupled by the first and the second fastening means 210 and 220, it is possible to perform the tilt function and the telescopic function at a time through the operation of the control lever 109.

The inner block 240 has a shape of a rectangular box having a central portion, through which one side of the distance bracket 250 extends. A hole 245 is formed through one side of the inner block 240, and the first fastening means extends through the hole 245. It is preferable that the surface to be in contact with the outer surface of the inner tube 103 is subjected to a rounding process, so as to conform to the shape of the outer surface of the inner tube 103.

The outer block 230 is disposed between both sides of the distance bracket 250 and plate bracket 280, and one side of the distance bracket 250 extends through the middle part of the outer block 230. The outer block 230 is fixed to the distance bracket 250 and the plate bracket 280 by the first fastening means 210 and the second fastening means 220.

It is preferable that the surface to be in contact with the outer surface of the inner tube 103 is subjected to a rounding process in conformity to an outer peripheral shape of the distance bracket 250 for the purpose of smooth transfer of the fastening force.

It is also preferred that the inner block 240 and the outer block 230 are made from reinforced plastics having an elastic force for appropriately transferring the fastening force by the operation of the control lever 109 to the inner tube 103, the outer tube 105 and the distance bracket 250.

The distance bracket 250 has a shape of a ring that surrounds the outer surface of the outer tube 105. Fastening holes 255, 255' are formed through both sides of the distance bracket 250. The first and the second fastening means 210 and 220 extend through the plate bracket 280 and the outer block 230 and are inserted through the fastening holes 255, 255'.

The distance bracket 250 includes a T-shaped part 253. Both wings of the T-shaped part 253 are provided with coil springs, which are connected to the mounting bracket 107 and provide an elastic force during the tilt operation of the steering apparatus.

According to the present invention as described above, a tilt-and-telescope steering apparatus includes an outer block between a distance block and a plate block, which are assembled together by a fastening means, which is in line with a longitudinal axis of an outer tube and is operated in cooperation with a control lever, so that the apparatus can be employed in a car having a specification requiring an adjustment bolt extending through the outer tube and can improve a space use efficiency by reducing an additional space for the adjustment bolt.

Also, a tilt-and-telescope steering apparatus according to the present invention includes, in substitution for a conventional bush disposed between an outer tube and an inner tube, an inner block that can move along a telescopic adjustment hole formed on the lateral surface of the outer tube while pressing the outer surface of the inner tube through the operation of the control lever, so that a driver can freely control the load of the telescope. Further, in the apparatus, the plate bracket, the outer block and the inner block are integrally coupled through a fastening means, so that it is possible to simultaneously perform a tilt function and a telescope function through the operation of the control lever.

The spirit of the present invention has been described above for illustrative purposes, it is understood by those skilled in the art to which the present invention belongs that various changes and modifications in forms and details may be made therein without departing from the essential characteristics of the present invention. Accordingly, disclosed embodiments of the present invention are not intended to limit but intended to describe the spirit of the present invention. The spirit of the present invention is not limited to such embodiments. The protecting range of the present invention is to be construed according to the appended claims and it should be construed that every technical spirit within ranges equivalent to the claims are included in the scope of the present invention.

What is claimed is:

1. A tilt-and-telescope steering apparatus comprising:
   an integrally formed substantially U-shaped plate bracket surrounding an outer surface of an outer tube and having tilt adjustment holes formed on both sides thereof;
   said outer tube surrounding an inner tube, said outer tube having a telescopic adjustment hole formed in at least one side thereof;
   a ring-shaped distance bracket surrounding the outer surface of the outer tube and having fastening holes formed through both sides thereof;
   an outer block positioned between the plate bracket and the distance bracket, the outer block having a recess formed in an inner surface thereof, the outer block recess configured to receive and engage the distance bracket;
   an inner block disposed substantially within the outer block so as to extend through the outer block from the inner surface of the outer block to an opposite outer surface adjacent the plate bracket, the inner block having a recess formed therein, the recess of the inner block aligning with the recess of the outer block, the inner block having an inner surface configured to extend beyond an inner surface of the distance bracket through the telescopic adjustment hole of the outer tube and into selective engagement with an outer surface of the inner tube, wherein the inner block recess is configured to receive and engage a portion of the distance bracket; and
   fastening bolts extending through the plate bracket, the outer block, the inner block and into the fastening holes of the distance bracket;
   a control arm operable to fasten the plate bracket and fix the distance bracket and inner tube relative to the plate bracket.

2. The apparatus as claimed in claim 1, wherein the inner block is longitudinally movable along the telescopic adjustment hole formed in the outer tube.

3. The apparatus of claim 1, wherein the fastening bolts are aligned with a longitudinal axis of the outer tube.

4. The apparatus of claim 1, wherein an inner surface of the outer block recess includes an arcuate shape conforming to and configured to engage an outer surface of the distance bracket, and wherein the inner block recess includes an arcuate shape conforming to the arcuate shape of the outer block recess and the outer surface of the distance bracket.

5. The apparatus of claim 1, wherein the inner surface of the inner block includes an arcuate shape conforming to the shape of the outer surface of the inner tube.

6. The apparatus of claim 1, wherein the inner block includes a rectangular shape with a length along a longitudinal axis thereof greater than a width of the distance bracket.

7. The apparatus according to claim 1, wherein operation of the control arm to fasten the plate bracket further includes engaging the inner block to the outer surface of the inner tube to fix the inner tube relative to the plate bracket, and engaging the outer block to the plate bracket to fix the distance bracket from moving along the tilt adjustment holes of the plate bracket.

* * * * *